(12) United States Patent
Mtauweg et al.

(10) Patent No.: US 10,094,419 B2
(45) Date of Patent: Oct. 9, 2018

(54) HYBRID SHAFT BEARING, WIND GENERATOR COMPRISING A HYBRID SHAFT BEARING, USE OF THE HYBRID SHAFT

(71) Applicant: AREVA WIND GMBH, Bremerhaven (DE)

(72) Inventors: Samer Mtauweg, Bremerhaven (DE); Joachim Arndt, Loxstedt (DE); Klaus Pischel, Schiffdorf-Spaden (DE)

(73) Assignee: AREVA WIND GMBH (DE)

( * ) Notice: Subject to any disclaimer, the term of this patent is extended or adjusted under 35 U.S.C. 154(b) by 90 days.

(21) Appl. No.: 15/126,624

(22) PCT Filed: Mar. 20, 2015

(86) PCT No.: PCT/EP2015/055897
§ 371 (c)(1),
(2) Date: Sep. 16, 2016

(87) PCT Pub. No.: WO2015/140286
PCT Pub. Date: Sep. 24, 2015

(65) Prior Publication Data
US 2017/0082141 A1    Mar. 23, 2017

(30) Foreign Application Priority Data

Mar. 20, 2014  (EP) ..................... 14160922

(51) Int. Cl.
*F16C 21/00*        (2006.01)
*F16C 17/10*        (2006.01)
(Continued)

(52) U.S. Cl.
CPC .............. *F16C 21/00* (2013.01); *F03B 11/06* (2013.01); *F16C 17/10* (2013.01); *F16C 17/20* (2013.01);
(Continued)

(58) Field of Classification Search
CPC .......... F16C 17/00; F16C 17/10; F16C 17/20; F16C 19/36; F16C 19/361; F16C 19/38;
(Continued)

(56) References Cited

U.S. PATENT DOCUMENTS 3,642,331 A * 2/1972 Silver .................. F16C 17/024
                                                    384/102
3,708,215 A   1/1973 Wilcock et al.
(Continued)

FOREIGN PATENT DOCUMENTS

DE        2159455 A1    6/1973
EP        2565475 A     3/2013
(Continued)

OTHER PUBLICATIONS

International Preliminary Report on Patentability, dated Sep. 20, 2016.
(Continued)

*Primary Examiner* — Phillip A Johnson
(74) *Attorney, Agent, or Firm* — Carlson, Gaskey & Olds, P.C.

(57) ABSTRACT

A hybrid shaft bearing, a wind generator comprising the hybrid shaft bearing, a use of the hybrid shaft bearing, and a method of operating the hybrid shaft bearing is provided. The hybrid shaft bearing comprises a hydrodynamic friction bearing and a rolling bearing. Both the hydrodynamic friction and rolling bearings cooperate with a support structure and rotatably support a shaft. The hydrodynamic friction bearing is a passive hydrodynamic bearing.

16 Claims, 10 Drawing Sheets

(51) Int. Cl.
*F16C 17/20* (2006.01)
*F03B 11/06* (2006.01)
*F16C 19/36* (2006.01)
*F16C 19/38* (2006.01)

(52) U.S. Cl.
CPC ............ *F16C 19/361* (2013.01); *F16C 19/38* (2013.01); *F16C 2300/14* (2013.01); *F16C 2360/31* (2013.01)

(58) Field of Classification Search
CPC .... F16C 19/383; F16C 19/385; F16C 19/386; F16C 21/00; F16C 25/04; F16C 25/083; F16C 2229/00; F16C 2360/31; F03B 11/06; F03B 11/063
See application file for complete search history.

(56) References Cited

U.S. PATENT DOCUMENTS

| | | | | |
|---|---|---|---|---|
| 3,759,588 A | * | 9/1973 | Anderson | ............... F16C 19/49 384/101 |
| 7,377,743 B2 | | 5/2008 | Flodman et al. | |
| 2012/0114488 A1 | * | 5/2012 | Giger | ...................... F16H 1/227 416/170 R |
| 2012/0237152 A1 | * | 9/2012 | Wheals | ................... F16C 19/52 384/548 |
| 2013/0052017 A1 | * | 2/2013 | Madge | .................... F16C 39/02 416/170 R |
| 2016/0298753 A1 | * | 10/2016 | Leimann | ................ F16H 57/021 |

FOREIGN PATENT DOCUMENTS

| | | | | |
|---|---|---|---|---|
| GB | 1217043 A | | 12/1970 | |
| GB | 1331542 A | * | 9/1973 | ............. F16C 21/00 |
| JP | 2010164151 A | | 7/2010 | |
| JP | 5012066 | | 8/2012 | |

OTHER PUBLICATIONS

English Translation of Office Action in JP counterpart Application No. 2017-500426, dated Aug. 29, 2017.

English Translation of Office Action in KR counterpart Application No. 10-2016-7029360, dated Oct. 18, 2017.

International Search Report, dated Sep. 7, 2015.

* cited by examiner

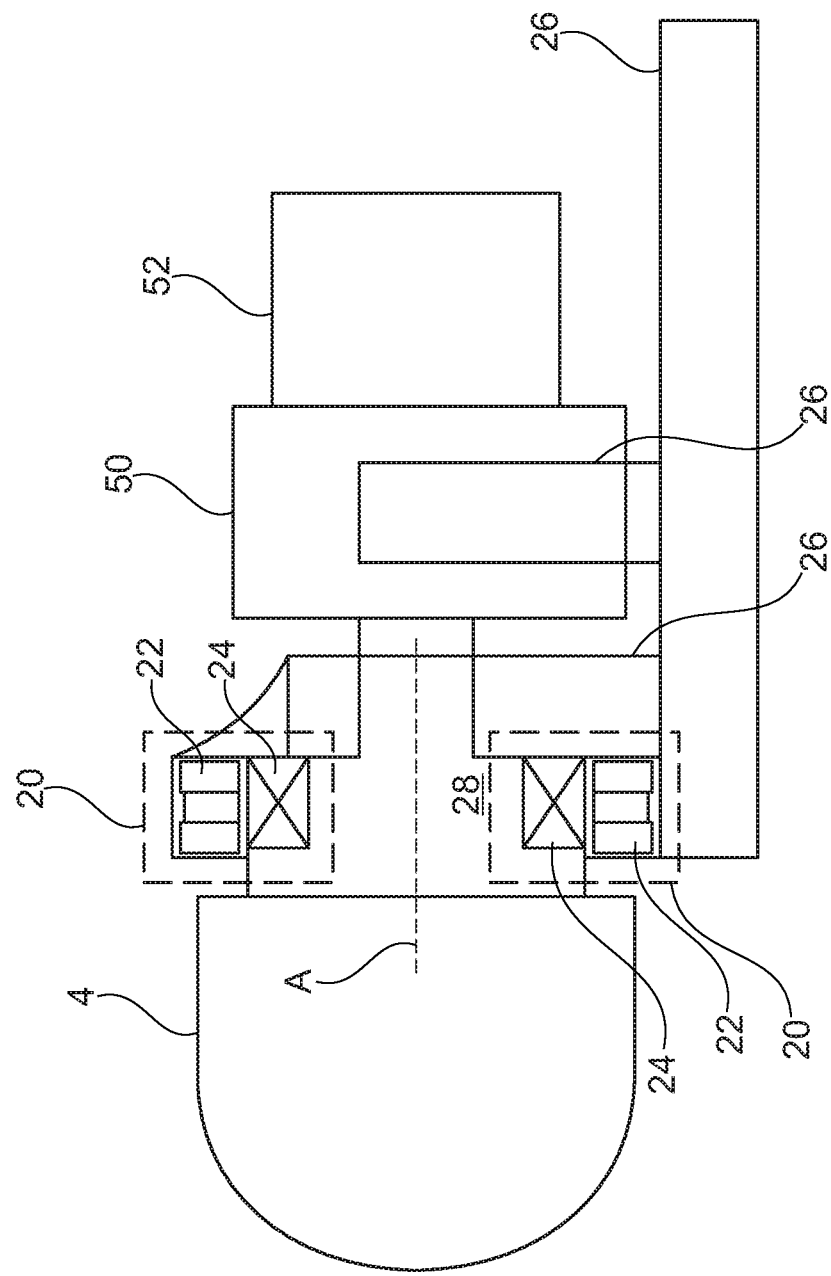

HYBRID SHAFT BEARING, WIND GENERATOR COMPRISING A HYBRID SHAFT BEARING, USE OF THE HYBRID SHAFT

CROSS-REFERENCE TO RELATED APPLICATIONS

This application is the U.S. national phase of PCT/EP2015/055897, filed Mar. 20, 2015, claiming priority to EP 14 160 922.2, filed Mar. 20, 2014.

FIELD OF THE INVENTION

The invention relates to a hybrid shaft bearing comprising a hydrodynamic friction bearing and a rolling bearing. The invention also relates to a wind generator comprising the hybrid shaft bearing and to the use of the hybrid shaft bearing. Furthermore, the invention relates to a method of operating the hybrid shaft bearing.

BACKGROUND

In a wind generator, the main shaft couples the rotor hub with a gear, which drives a generator for the production of electricity. The main shaft is frequently supported by friction bearings or sliding bearings. There are mainly two types of friction bearings, hydrostatic bearings and hydrodynamic bearings. Hydrostatically lubricated bearings apply an external oil pump to establish a sufficient lubricating film in the lubricating gap. In a hydrodynamic friction bearing, the pressurized oil film between the bearing surface and the journal is maintained by a hydrodynamic effect, which is due to the rotation of the journal or shaft. However, upon start-up or shut-down of the rotation of the shaft in a hydrodynamic friction bearing, the lubrication between the sliding surfaces can be insufficient. There is a certain critical speed of rotation, which has to be reached in order to establish a lubricating film having a minimum thickness. Upon start-up or shut-down, for example of a wind generator comprising a hydrodynamic friction bearing for supporting the main shaft, this can lead to mixed friction states. These, however, cause wear in the basically wear-free friction bearing. A contact of the sliding surfaces cannot be avoided in all situations. In addition to this, at low speeds of rotation of the shaft, there is no play-free support of a main shaft, because the hydrodynamic friction bearing is generally not play-free at low rotational speeds.

In conventional shaft bearings, in particular for support of the main shaft in a wind generator, the hydrodynamic friction bearings are operated as hydrostatic friction bearings during the start-up and shut-down period. This is to avoid a contact between the sliding surfaces and to minimize the play in the bearing. However, this requires a high-pressure lubricating system for supplying lubricant to the lubricating gap of the bearing. This represents a technically complex and sometimes cost-intensive solution.

Document U.S. Pat. No. 3,708,215 discloses a hybrid bearing comprising a friction bearing and a rolling bearing. The bearing load is shifted from the rolling bearing to the friction bearing and back to the rolling bearing when the supported shaft starts and stops rotating. The transition between the rolling bearing and the friction bearing is performed by raising or lowering a pressure in the lubricating gap of the friction bearing. An active oil pressurization system is, however, needed, which also represents a technically complex and rather costly solution.

It is therefore desirable to have a less complex, reliable and economic shaft bearing. In particular the bearing should be suitable to take up high loads, for example when it is applied to support a main shaft in a wind generator.

SUMMARY

It is an object of the invention to provide an enhanced hybrid shaft bearing and an enhanced wind generator comprising the shaft bearing. Furthermore, it is an object of the invention to provide an enhanced method of operating a hybrid shaft bearing and an advantageous use of the hybrid shaft bearing.

In one aspect of the invention, a hybrid shaft bearing comprising a hydrodynamic friction bearing and a rolling bearing is provided. Both the hydrodynamic friction and rolling bearings cooperate with a support structure and support a shaft. The hydrodynamic friction bearing is a passive hydrodynamic bearing. In other words, the hybrid bearing dispenses with active supply of lubricant to a lubricating gap in the hydrodynamic friction bearing. In particular, the hybrid bearing does not comprise an oil pump or another oil supply system, which can actively pressurize the lubricant in the hydrodynamic friction bearing.

This advantageously increases the reliability of the hybrid shaft bearing and potentially lowers the requirements for maintenance. When compared to friction bearings, which apply an active system for pressurizing the lubricant, the design of the hybrid bearing according to aspects of the invention is technically simpler in that it requires less actively controlled parts, for example no active oil supply system. In particular, when the hybrid bearing is mounted in an offshore wind generator, the reduced requirements for maintenance lower the service expenses significantly. Furthermore, the design of the hybrid bearing having a hydrodynamic friction bearing and a rolling bearing, which are substantially independent from each other, allows each of the bearings to be replaced separately. This advantageously simplifies maintenance of the hybrid shaft bearing.

According to an advantageous embodiment of the invention, the rolling bearing is prestressed. It is prestressed in that a pretension is applied on the shaft, wherein this pretension has a value, which is at least substantially equal to or greater than a minimum capacity load of the friction bearing. Advantageously, the rolling bearing supports the shaft during start-up and shut-down of rotation of the shaft, for example during start-up and shut-down of a wind generator. The hydrodynamic friction bearing takes over the bearing load, when a certain speed of rotation of the shaft is reached. At lower speeds, the rolling bearing supports the shaft. In addition to this, the bearing is play-free even at low speeds of rotation, since a predetermined pretension is applied on the shaft by the prestressed rolling bearing. The value of the applied pretension ensures that under all operating conditions, there is a minimum thickness lubricating film in the lubricating gap of the hydrodynamic friction bearing. This is to avoid a contact between the sliding surfaces, which generally causes undesired wear in the bearing.

According to another embodiment of the invention, the pretension is set to a value, which is at least equal to the minimum capacity load of the hydrodynamic friction bearing at maximum speed of rotation of the shaft. This particular value of the pretension ensures that the bearing surfaces of the hydrodynamic friction bearing do not contact each other and no mixed friction state will occur.

For adjustment of the pretension, the hybrid shaft bearing advantageously comprises an adjustment device. This is configured for adjusting the amount of pretension. The adjustment device is generally an actuator. It is configured to adjust the pretension to a suitable predetermined value, which, however, remains constant during operation of the hybrid bearing. For example, the adjustment device is adjusted once upon implementation of the hybrid shaft bearing in a wind generator. It can be, for example, a fixed intermediate member, an adjustment screw, or an adjustable wedge-like part.

According to an advantageous embodiment of the invention, the hydrodynamic friction bearing and the rolling bearing are arranged parallel. The bearings are parallel in that both are coupled to the support structure and rotatably support the shaft. In other words, a static part of a respective one of the bearings is rigidly fixed or mounted on the support structure and a movable part rotates with the shaft. With respect to the hydrodynamic friction bearing, for example, a bushing can be directly mounted on the support structure. In the rolling bearing having rolling elements, which are arranged between an inner and an outer ring, for example, the inner ring rotates with the shaft and the outer ring is rigidly fixed on the supporting structure.

The hybrid shaft bearing according to this embodiment of the invention can further comprise at least one actuator, which is configured to move a bearing part of either one or both of the hydrodynamic friction bearing and the rolling bearing. In particular, the actuator is a hydraulic actuator. Various other types of actuators including motor driven actuators can be suitable.

For example, the rolling bearing comprises a first actuator supporting a rolling element of the rolling bearing. The first actuator is configured to move the rolling element towards and away from a bearing surface, which cooperates with the rolling element. Advantageously, the rolling element can be moved towards the bearing surface, when the shaft starts rotating. Similarly, the shaft can be supported by the rolling bearing, when the shaft is not rotating. Upon start-up of, for example, a wind generator comprising the hybrid shaft bearing, the rolling bearing releases the friction bearing from load until a sufficiently high rotational speed is reached. When the shaft rotates, for example, at a certain percentage of the nominal speed, the rolling element can be moved off the bearing surface by retracting the first actuator. The hydrodynamic friction bearing will then take up the entire load of the shaft. In a hybrid bearing according to this embodiment of the invention, a minimum wear of the bearing components can be achieved. The rolling bearing is only used under operating conditions, in which the hybrid bearing is exposed to relatively low loads. Furthermore, the operating time of the rolling bearing is very limited.

In still another advantageous embodiment of the invention, the sliding bearing comprises a second actuator. This is configured to move a sliding surface of the hydrodynamic friction bearing with respect to an opposite sliding surface. In particular, the bearing comprises a sliding block, which carries one of the sliding surfaces of the hydrodynamic friction bearing. The sliding block is driven by the second actuator in that it is expandable and retractable. Advantageously, when the rotational speed of the shaft is sufficiently high for hydrodynamic operation of the hydrodynamic bearing, the sliding surface, which resides on the sliding block, can be moved towards the opposite (cooperating) sliding surface. Due to this action, the sliding bearing will take up the majority of the load of the shaft. The rolling bearing is therefore released from load. This will minimized the wear in the rolling bearing.

It is understood, the hybrid shaft bearing can comprise more than one first actuator for moving more than one rolling element. Similarly, the hybrid shaft bearing can comprise more than one second actuator for moving more than one sliding block.

In still another embodiment of the invention, the friction bearing and the rolling bearing are coupled in series. One of the two bearings supports the shaft and the other bearing is coupled to the support structure. The bearing, which is coupled to the support structure, takes up a load from the bearing supporting the shaft. It transfers the load to the support structure. In an advantageous embodiment of the invention, the roller bearing supports the shaft and the friction bearing is coupled to the support structure. In this design of the hybrid bearing, the hydrodynamic friction bearing experiences the higher peripheral speed, when compared to the rolling bearing. This is due to the fact that the hydrodynamic friction bearing is arranged at a greater radius than the rolling bearing. The radius can be a distance between a respective one of the bearings and a central axis of the supported shaft. Due to the high peripheral speed, the friction bearing will be able to take up the load at a low number of revolutions of the shaft. This comparably lower speed of rotation is compared to a situation, in which the friction bearing and the rolling bearing are arranged at a same radius.

In another embodiment of the invention, the hybrid shaft bearing is a radial bearing, a thrust bearing, or an axial-radial bearing. Similarly, this applies to the rolling bearing and the hydrodynamic friction bearing.

According to another advantageous aspect of the invention, a wind generator having a drive train comprising a main shaft is provided. The main shaft is supported by a hybrid shaft bearing according to aspects of the invention. In particular, the wind generator is an offshore wind generator. The moderate requirements with respect to maintenance, the high reliability and wear resistance of the hybrid shaft bearing, render it particularly suitable for application in a wind generator, further in particular in an offshore wind generator. Further aspects and advantages of the wind generator according to aspects of the invention are similar to those, which are mentioned with respect to the hybrid shaft bearing. Therefore, these will not be repeated.

In still another aspect of the invention, an advantageous use of the hybrid shaft bearing is provided. The hybrid shaft bearing according to aspects of the invention is used for supporting a main shaft in a drive train of a wind generator, in particular in an offshore wind generator. Again, further aspects and advantages of the use of the hybrid bearing are similar to those, which are mentioned with respect to the hybrid shaft bearing, and will not be repeated.

According to another advantageous aspect of the invention, a method for operating a hybrid shaft bearing is provided. The hybrid shaft bearing comprises a hydrodynamic friction bearing and a rolling bearing. The hydrodynamic friction bearing and the rolling bearing are arranged parallel in that both bearings are coupled to a support structure and rotatably support a shaft. Furthermore, the hybrid shaft bearing comprises at least one actuator, which is configured to move a bearing part of either one or both of the hydrodynamic friction bearing and the rolling bearing. The at least one actuator is expanded or retracted upon start-up or shut-down of the rotation of the shaft.

In particular, a rolling element of the rolling bearing is supported by a first actuator. This is configured to move the rolling element towards and away from a bearing surface, which cooperates with the rolling element. When the shaft starts rotating and a first predetermined start-up period expires, the first actuator is retracted. This typically applies in a situation, in which a wind generator having a hybrid shaft bearing according to aspects of the invention is started. When the shaft slows down, for example upon shut-down of the wind generator, and a first predetermined shut-down period expires, the first actuator is retracted.

Advantageously, the hydrodynamic bearing takes up the load of the shaft after an initial start-up period. The transition between the hydrodynamic operation and the rolling bearing operation is controlled by moving the rolling element towards and away from the cooperating bearing surface.

Furthermore, when the hydrodynamic friction bearing comprises a second actuator, which is configured to move a sliding block carrying one of the sliding surfaces of the hydrodynamic friction bearing, a second actuator moves the sliding block towards and away from a bearing surface. This is performed as a function of a second start-up period and second shut-down period, respectively. When the shaft starts rotating and the second start-up period expires, the sliding block is expanded. Similarly, when the shaft slows down and the second predetermined shut-down period expires, the second actuator retracts the sliding block.

This operation of the sliding block controls the transition between an operating state, in which the hydrodynamic bearing takes up the load of the shaft and a mode of operation in which the hybrid bearing operates as a rolling bearing. The transition between the two states is controlled by moving the sliding block towards and away from the cooperating bearing surface.

The first predetermined start-up and shut-down periods as well as the second predetermined start-up and shut-down periods can be a function of the speed of rotation of the shaft. It is, however, also possible that predetermined periods of time, for example a number of seconds after a signal starting or stopping the wind generator, define the mentioned periods.

Further advantages of the method for operating the hybrid shaft bearing are similar to those, which have been mentioned with respect to the hybrid shaft bearing and shall not be repeated.

BRIEF DESCRIPTION OF THE DRAWINGS

Further aspects and features of the invention ensue from the following description of preferred embodiments of the invention with reference to the accompanying drawings, wherein FIG. 10 is a simplified schematic drawing illustrating a hybrid shaft bearing according to an embodiment of the invention; the hybrid shaft bearing having a rolling bearing and a hydrodynamic friction bearing, which are arranged in series, wherein the hybrid shaft bearing is applied to support a main shaft in a drive train of a wind generator.

DETAILED DESCRIPTION

Figure 1:
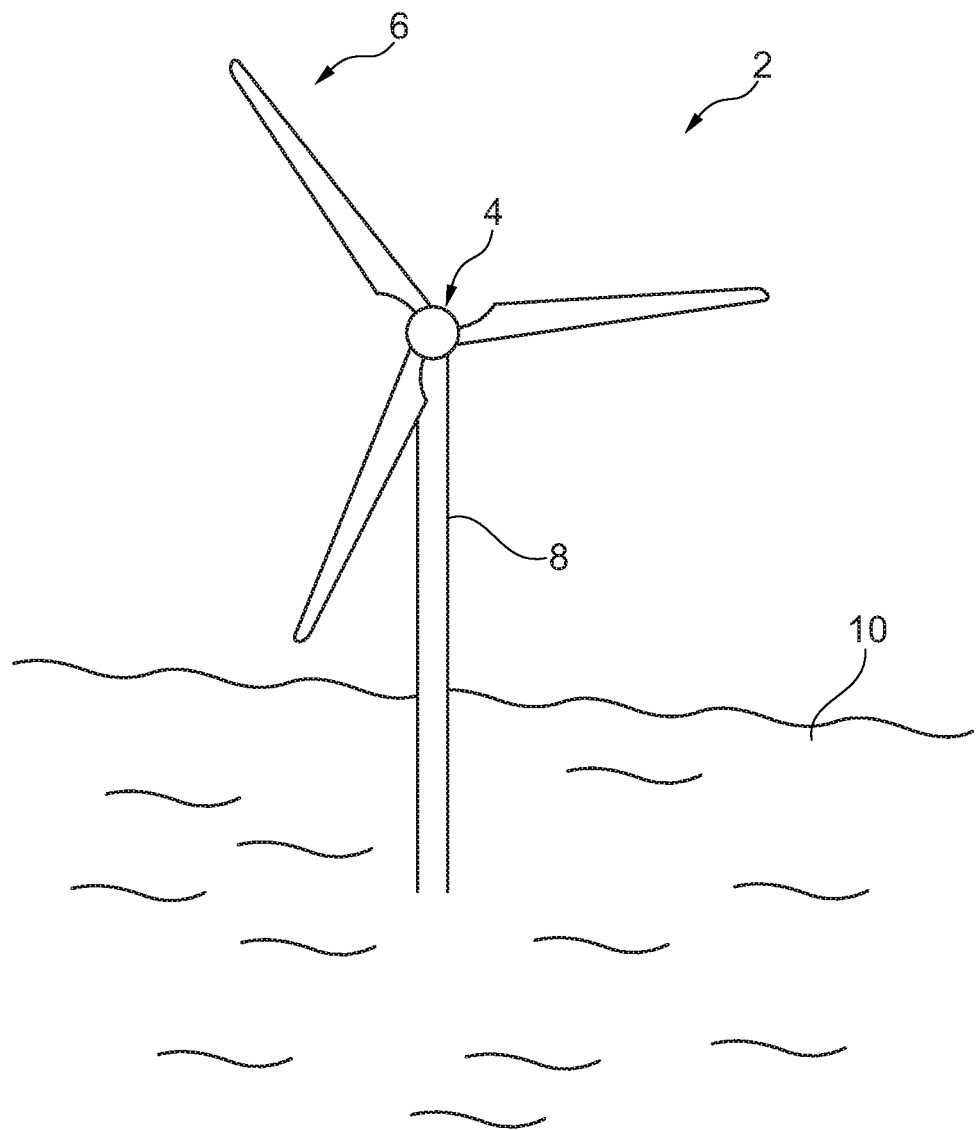
FIG. 1 is a simplified offshore wind generator, according to an embodiment of the invention.

FIG. 1 is a simplified perspective view of a wind generator 2. By way of an example, the wind generator 2 is an offshore wind generator. It comprises a rotor hub 4 carrying rotor blades 6. A supporting structure 8, for example a tower, carries a nacelle (not visible) and is based on a suitable underwater foundation in the sea 10.

A main shaft of the wind generator 2 is driven by the rotor hub 4. It is further coupled to a gear, for example a planetary gear, for transfer of torque, which is applied on the main shaft by the rotor hub 4, to a driven shaft, which is further coupled to an electric generator for the production of electricity.

The main shaft of the wind generator 2 is supported by a hybrid shaft bearing, which comprises a rolling bearing and a hydrodynamic friction bearing.

Figure 2:
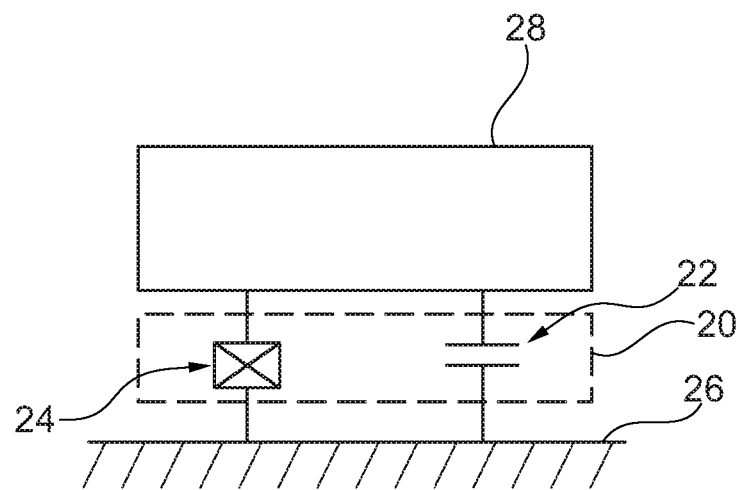
FIGS. 2 and 3 illustrate concepts of a hybrid bearing, according to embodiments of the invention, wherein a rolling bearing and a hydrodynamic bearing are arranged parallel.
Figure 3:
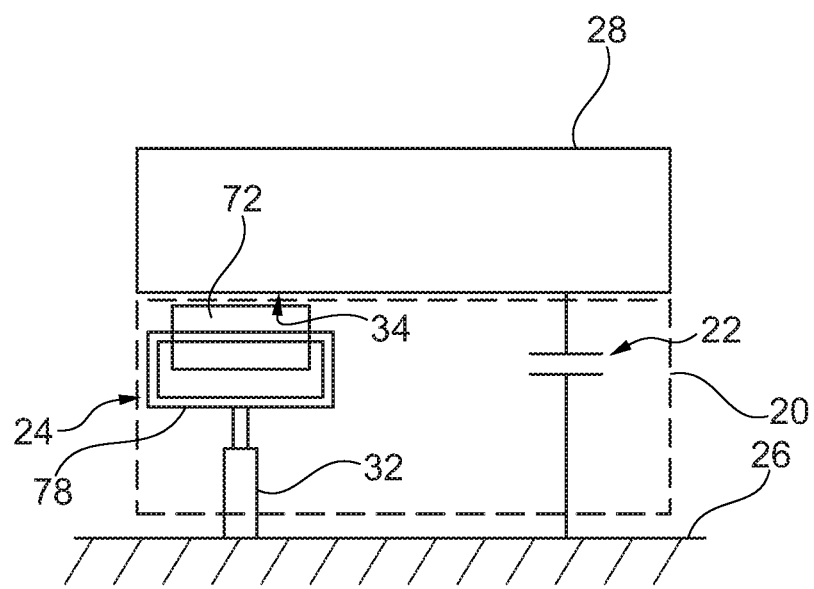

The simplified schematic drawings of FIGS. 2 and 3 illustrate two concepts of a hybrid shaft bearing 20, according to embodiments of the invention. These two embodiments of the invention refer to a type of the hybrid shaft bearing 20, in which a hydrodynamic friction bearing 22 and a rolling bearing 24 are arranged parallel. In other words, the hydrodynamic friction bearing 22 and the rolling bearing 24 are both coupled to a support structure 26 and rotatably support a shaft 28, which can be the main shaft of the wind generator 2.

In the embodiment of FIG. 2, the rolling bearing 24 is prestressed. The embodiment of FIG. 3 refers to a hybrid shaft bearing 20 having a retractable rolling element 72, which is operated by a first actuator 32. Firstly, reference will be made to the type of bearing, which is shown in FIG. 2. Further details of the other type of hybrid shaft bearing 20, which is shown in FIG. 3, will be explained further below.

In the embodiment of FIG. 2, a pretension of the rolling bearing 24 has a value, which is at least substantially equal to or greater than a minimum capacity load of the hydrodynamic friction bearing 22. In particular, the pretension of the rolling bearing 24 is set to a value, which is substantially equal to or greater than a minimum capacity load of the friction bearing 22 at maximum speed of rotation of the shaft 28. For example, this maximum speed of rotation is a maximum speed of rotation of a main shaft in a wind generator 2, according to its technical specification.

Figure 4:
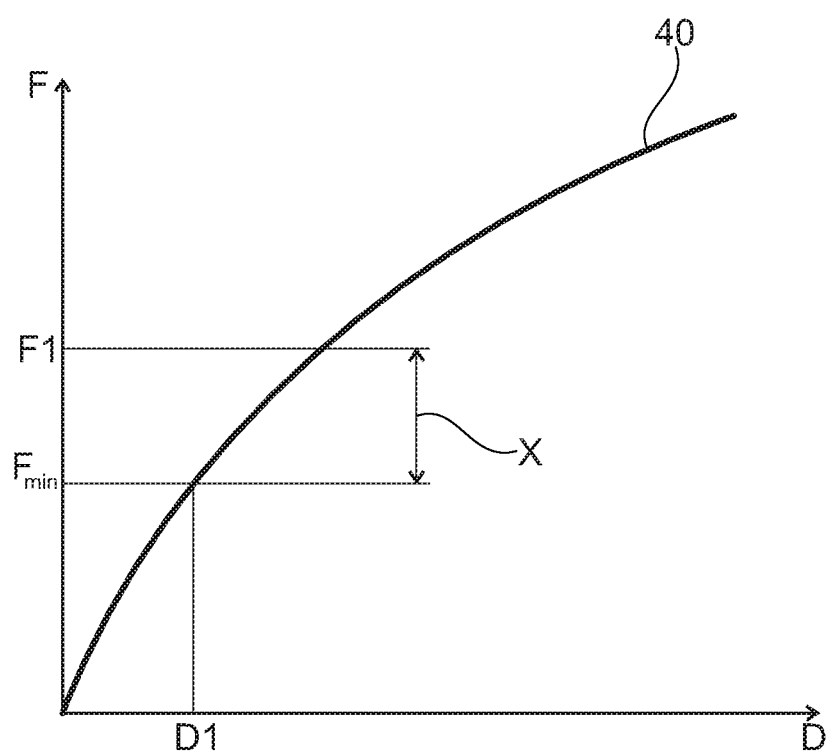
FIG. 4 is a simplified plot of a stiffness profile of a rolling bearing, which can be applied in a hybrid shaft bearing according to embodiments of the invention.

FIG. 4 is a simplified plot showing a stiffness profile 40 of a rolling bearing 24, which can be applied in the hybrid shaft bearing 20 according to the embodiment of FIG. 2. The bearing load F is plotted over the displacement D of the supported shaft 28. The value Fmin is the minimum required capacity load for supporting of the shaft 28. This for example applies in a situation, in which the wind generator 2 is shutdown or slowly rotates. The rolling bearing 24 is prestressed in that it is moved towards the shaft 28 by a displacement D1. This displacement is determined with respect to an unloaded position of the rolling bearing, in which the rolling element, however, contacts a corresponding bearing surface. The displacement D1 leads to a pretension, which equals the minimum capacity load Fmin, as it is defined by the stiffness profile 40 of the rolling bearing 24.

During operation of the wind generator 2, the hybrid shaft bearing 20 is subject to a load, which is equal to or higher than F1. At maximum rotation of the shaft 28, the hydrodynamic friction bearing 22 establishes a lubricating film having a minimum thickness, which is at least substantially equal to the displacement of the rolling bearing 24, when the load is increased from the minimum load Fmin to the load F1. This is indicated by the distance X between Fmin and F1 in FIG. 4. When the load on the hybrid shaft bearing 20 exceeds the load F1, the hydrodynamic friction bearing 22 will take up the additional loads, which exceed the value of F1. In other words, the load on the rolling bearing 24 is limited, which is advantageous with respect to its wear and life expectancy.

Advantageously, the hybrid shaft bearing 20 according to aspects of the invention is play-free. At low number of revolutions of the shaft 28, the rolling bearing 24 takes up the load until the lubricating film in the hydrodynamic friction bearing 22 is established. However, at higher rotational speeds of the supported shaft 28, which typically correspond with higher loads, the rolling bearing 24 is relieved from additional loads by the hydrodynamic friction bearing 22.

Figure 5:
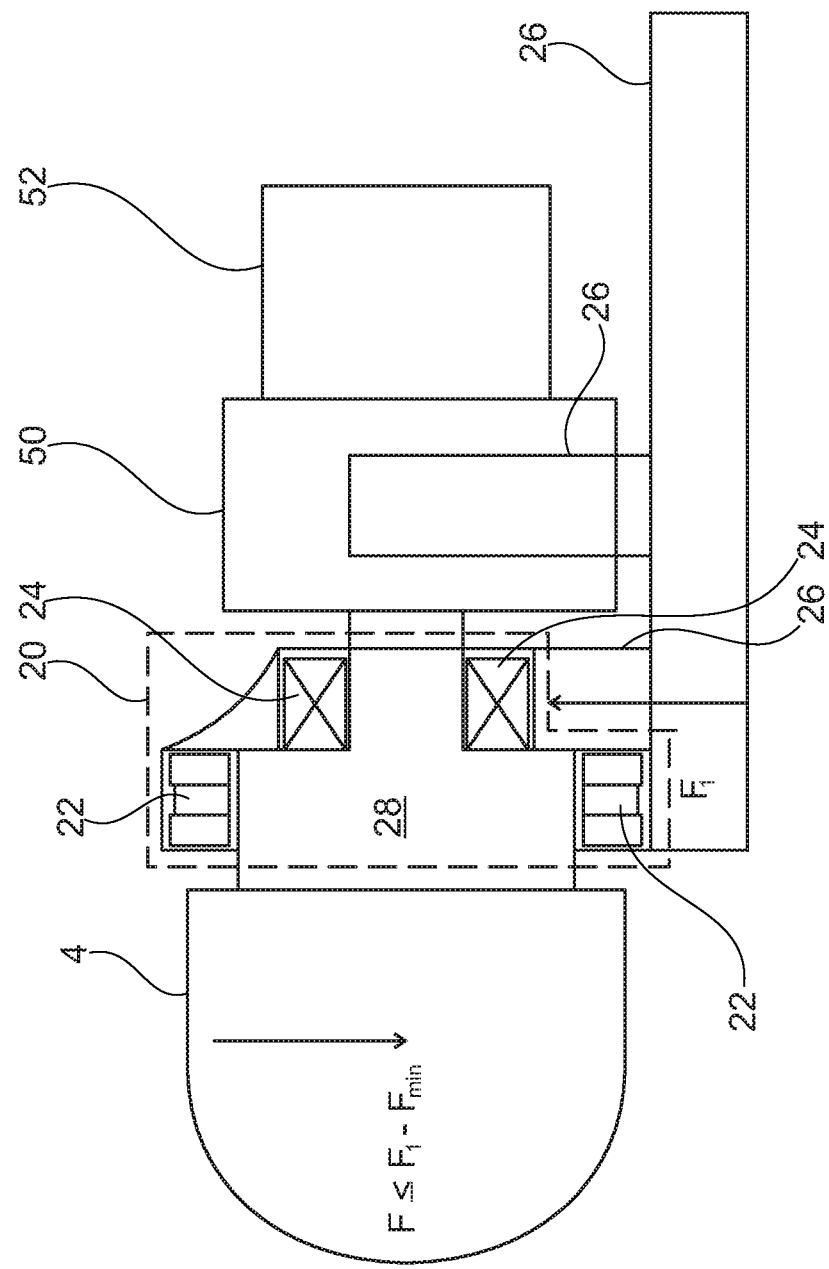
FIGS. 5 and 6 are simplified schematic drawings illustrating a hybrid shaft bearing, which is applied to support an main shaft in a drive train of a wind generator, according to an embodiment of the invention, wherein the figures refer to different operating states of the hybrid shaft bearing.

In FIG. 5, there is a simplified schematic drawing illustrating a hybrid shaft bearing 20, which is applied to support a main shaft 28 in a drive train of a wind generator 2. The main shaft 28 is coupled to a rotor hub 4 and transmits the torque from the rotor hub 4 to a gear 50. The gear 50 is further coupled to an electric generator 52 for production of electricity. The drive train of the wind generator 2 is mounted on a suitable support structure 26. The rolling bearing 24 and the hydrodynamic friction bearing 22 are arranged parallel in that both bearings are supported by the support structure 26 and rotatably support the shaft 28.

FIG. 5 illustrates an operating state, when the shaft 28 rotates with low speed, i.e. at a low number of revolutions, or is stationary. The force F, which is applied by the rotor hub 4, shall be equal to or lower than F1–Fmin. In this situation, the rolling bearing 24 takes up the full load of the rotating shaft 28, up to a value of F1.

Figure 6:
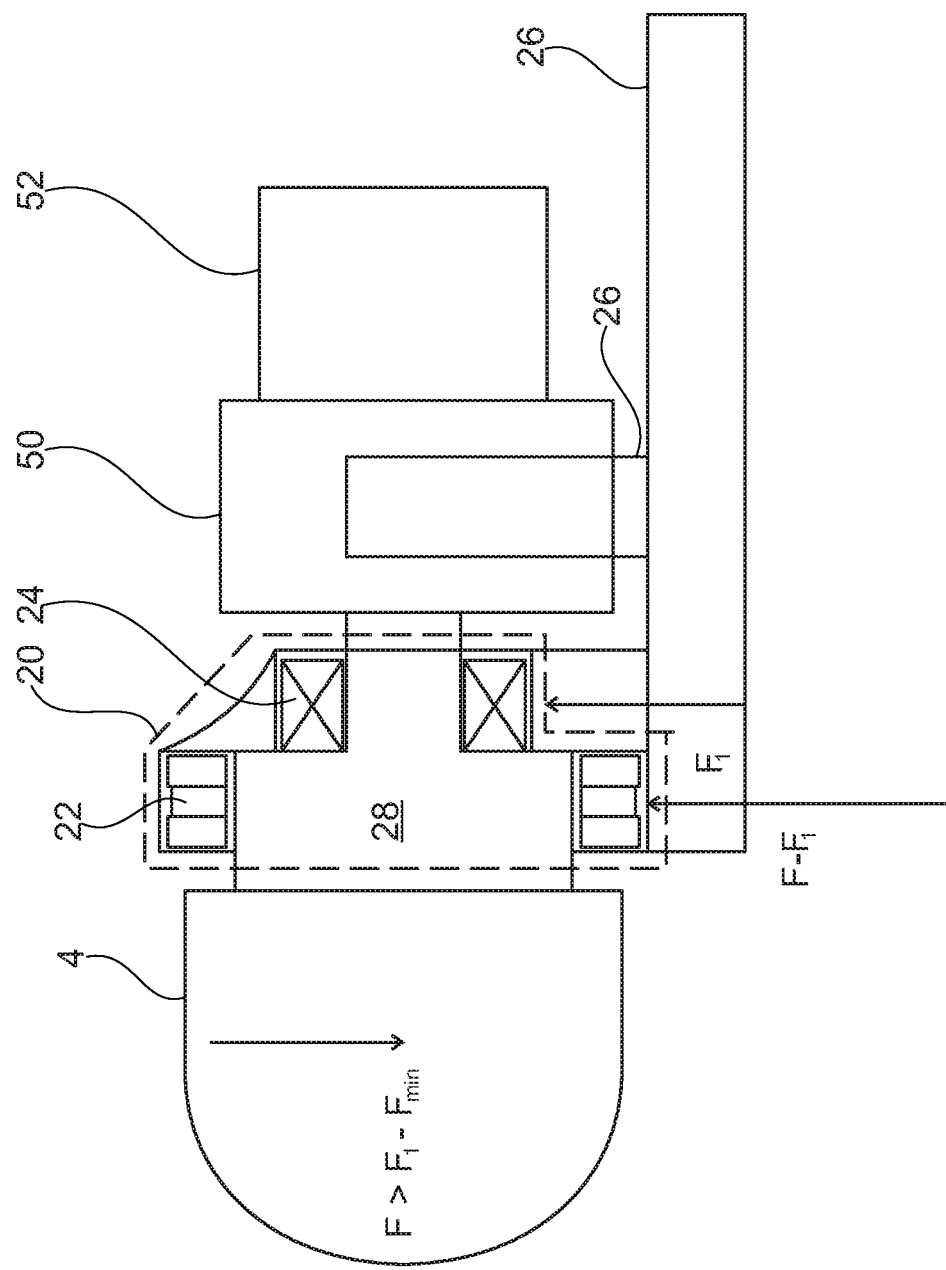

In FIG. 6, there is another simplified schematic drawing, which is similar to FIG. 5. However, a mode of operation at a higher rotational speed of the shaft 28 is illustrated. Same reference numerals are applied to indicate the same parts of the hybrid shaft bearing 20 and the drive train. When the load F of the rotor hub 4 is higher than the difference between F1 and Fmin, the additional load, which is F–F1 is taken up by the hydrodynamic friction bearing 22. The rolling bearing 24 is exposed to a maximum load, which does not exceed F1.

Figure 7:
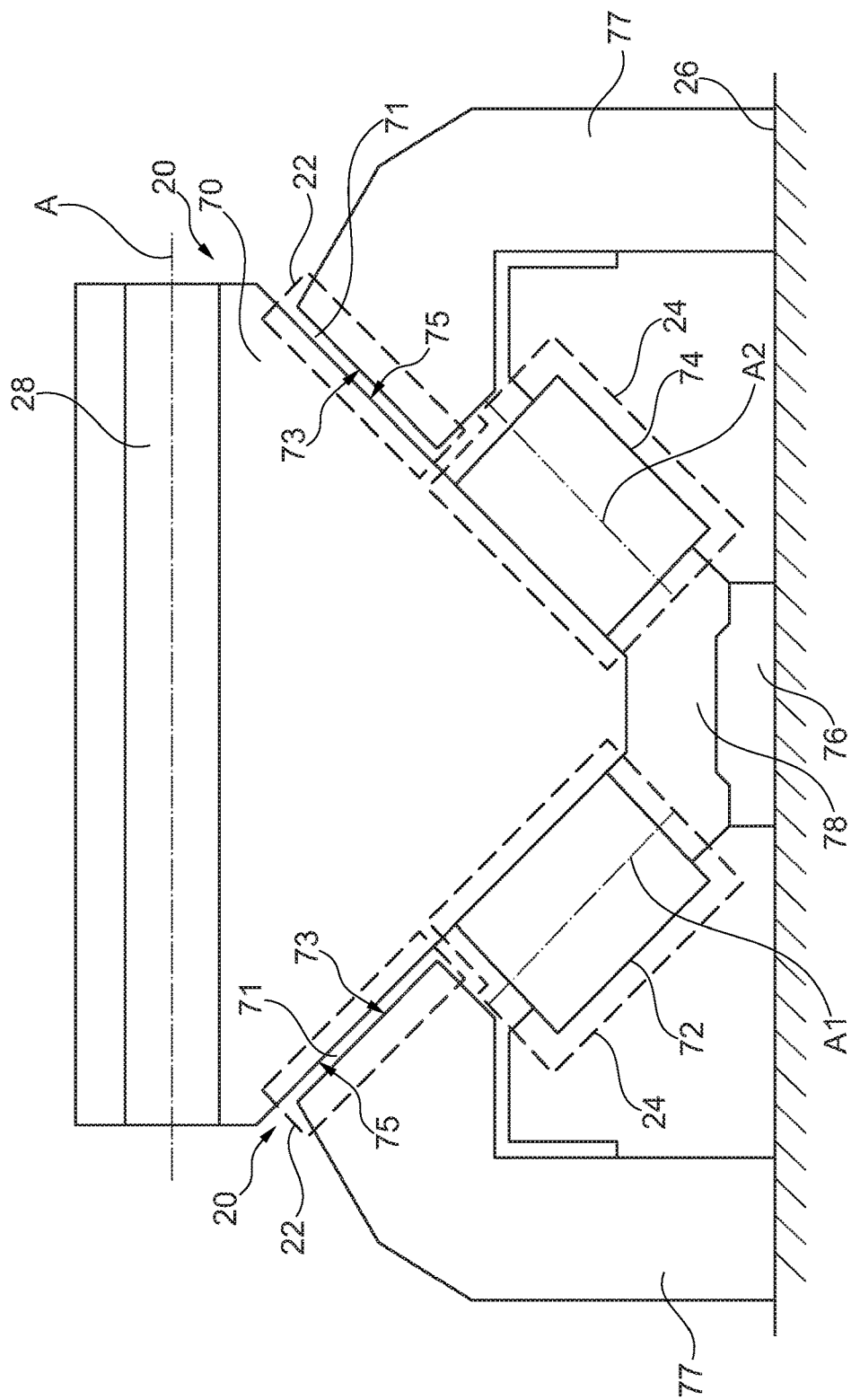
FIGS. 7 and 8 are simplified detailed views showing hybrid shaft bearings according to embodiments of the invention; the hybrid shaft bearings having a rolling bearing and a hydrodynamic bearing, which are arranged parallel, and the depicted hybrid shaft bearings are configured as axial-radial bearings to support a main shaft in a drive train of a wind generator, FIG. 9 schematically illustrates another concept of a hybrid shaft bearing, according to another embodiment of the invention, wherein a rolling bearing and a hydrodynamic friction bearing are arranged in series.

In FIG. 7, there is a simplified detailed view illustrating a hybrid shaft bearing 20, which is configured as an axial-radial bearing to support the shaft 28, which is in particular the main shaft in a power train of a wind generator 2. The shaft 28 projects along a main axis A and is provided with an outer ring 70. This interacts with the hydrodynamic friction bearing 22 and the rolling bearing 24 to support the shaft 28. The rolling bearing 24 comprises two rolling elements 72, 74, which rotate about a first axis A1 and a second axis A2, respectively. The first and the second axis A1, A2 have opposite inclination so as to provide an axial-radial bearing for the outer ring 70 and the shaft 28, respectively. The rolling bearing 24 is again prestressed. A pretension is applied using an adjustment device 76. In the embodiment of FIG. 7, this is a ring element. The adjustment device 76 is used to apply the desired pretension to a support member 78 holding the first and second rolling elements 72, 74. The first and the second rolling element 72, 74 are further supported by support members 77, which are mounted on the support structure 26.

The applied pretension is to ensure a minimum lubricating gap 71 between opposite sliding surfaces 73, 75 of the hydrodynamic friction bearing 22.

Figure 8:
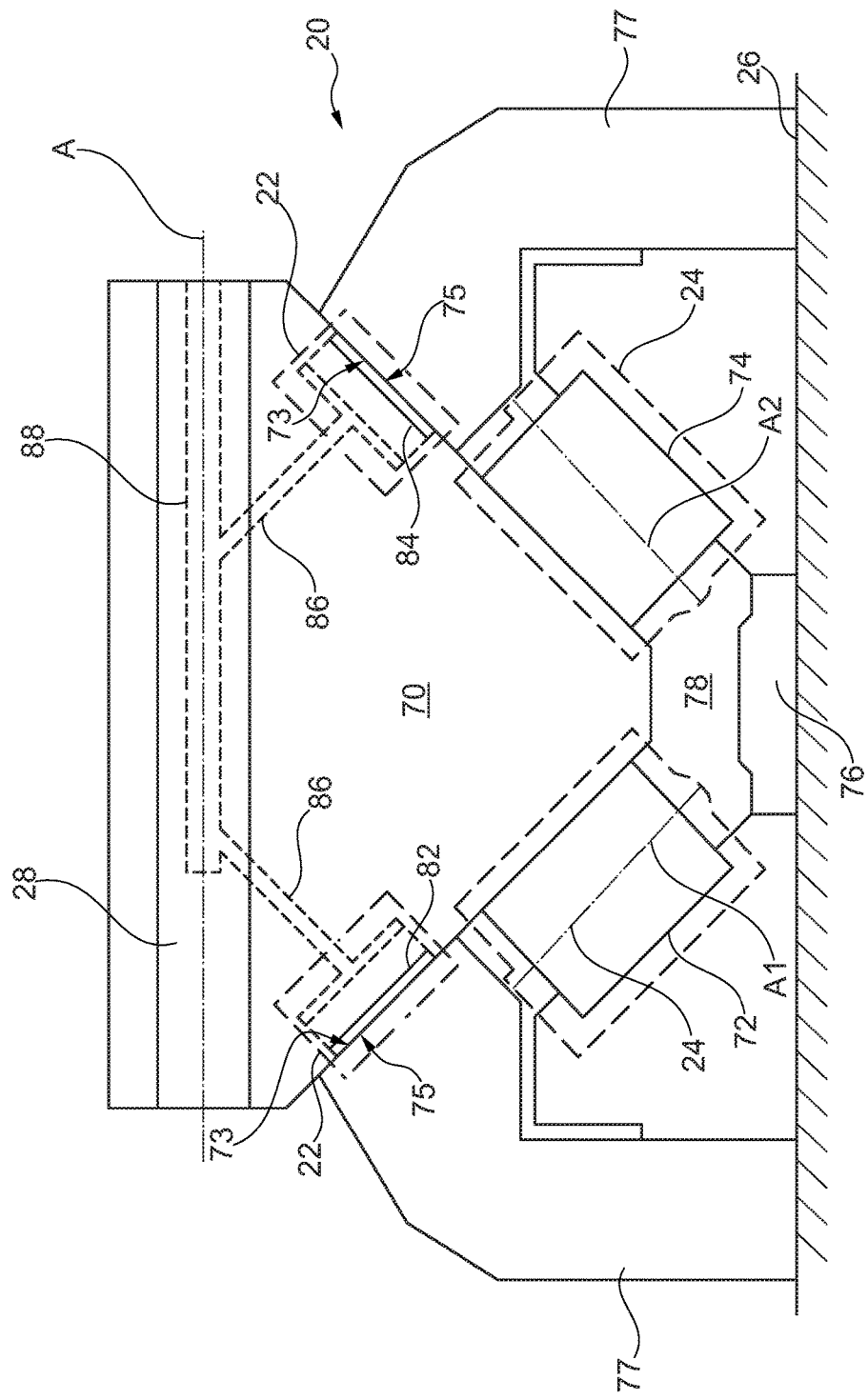

In FIG. 8, there is another simplified detailed view of a hybrid shaft bearing 20 according to another embodiment of the invention. The drawing is similar to that of FIG. 7; with the same parts being provided with same reference numerals.

The hydrodynamic friction bearing 22 according to this embodiment of the invention comprises first and second sliding blocks 82, 84, which are movable between an operating position, which is drawn in solid lines, and a retracted position, which is drawn in dashed lines. The sliding blocks 82, 84 are movable between the two positions using a second actuator. This can be a hydraulic actuator, for example a hydraulic piston or pump, which supplies a central fluidic passage 88 with pressurized hydraulic fluid. For operation of the sliding blocks 82, 84, the outer ring 70 may be provided with further hydraulic passages 86, which fluidically communicate with the central fluidic passage 88 projecting along the main axis A of the shaft 28. When the fluidic passages 86, 88 are supplied with a pressurized hydraulic fluid using a central actuator (not shown), the sliding blocks 82, 84 are driven towards a corresponding sliding surface 73. This is typically performed when the number of revolutions of the shaft 28 is sufficiently high for establishing the hydrodynamic film in the lubricating gap. Due to simplification of the drawing, the lubricating gap is not shown in FIG. 8. The sliding blocks 82, 84 each have a surface forming the opposite sliding surface 75 of the hydrodynamic friction bearing 22.

By expanding and retracting the sliding blocks 82, 84, the load, which is exposed by the shaft 28 on the hybrid bearing 20, can be shifted from the rolling bearing 24 to the hydrodynamic friction bearing 22 and back to the rolling bearing 24. This is advantageous, when the hybrid shaft bearing 20 is applied in a wind generator 2. When the wind generator 2 starts, the shaft 28 is first supported by the rolling bearing 24. When the speed of rotation of the rotor hub 4 is sufficiently high for operation of the hydrodynamic friction bearing 22, the sliding blocks 82, 84 are expanded and pushed towards the sliding surfaces 73. Consequently, the hydrodynamic friction bearing 22 takes up the load of the shaft 28.

Another concept for a hybrid shaft bearing 20, which offers the option to shift the load between the rolling bearing 24 and the hydrodynamic friction bearing 22 is illustrated in FIG. 3. There is another concept, which is behind this shaft bearing 20, when compared to that in FIG. 8. The hybrid shaft bearing 20 in FIG. 3 comprises a hydrodynamic friction bearing 22 and a rolling bearing 24, wherein the rolling bearing 24 comprises a second actuator 32. This is configured to move the rolling element 72 towards and away from a bearing surface 34, which cooperates with the rolling element 72. The rolling element 72 is supported by a schematically illustrated support member 78. The first actuator 32, for example a hydraulic actuator, engages this support member 78. When the number of revolutions of the supported shaft 28 is sufficiently high in that the hydrodynamic friction bearing 22 is capable of taking up the load of the shaft 28, the rolling element 72 of the rolling bearing 24 is retracted using the first actuator 32. This will reduce the wear in the rolling bearing 24. Since the hydrodynamic bearing 22 will therefore be used during normal operation of the wind generator 2, this applies to a majority of the operating time.

Figure 9:
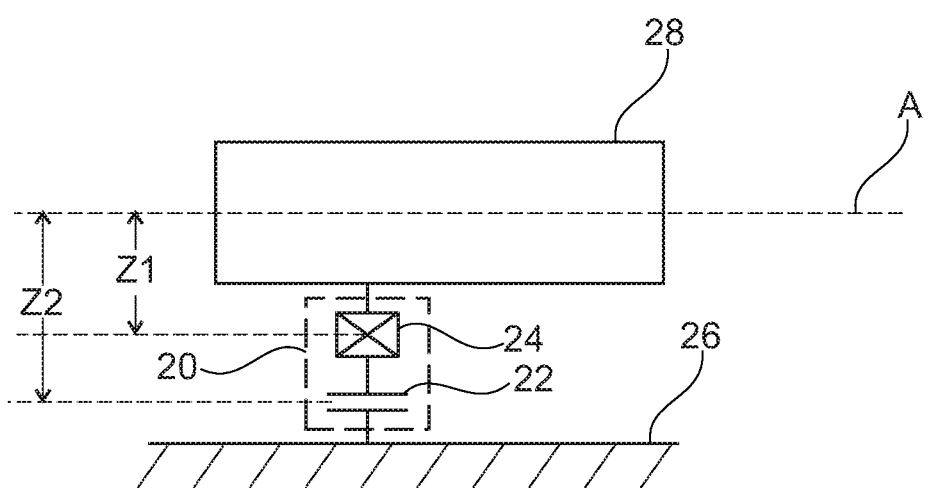

In FIG. 9, there is another schematic drawing illustrating a concept of a hybrid shaft bearing 20, according to another embodiment of the invention. The hydrodynamic friction bearing 22 and the rolling bearing 24 are coupled in series. The rolling bearing 24 supports the shaft 28 and the hydrodynamic friction bearing 22 is coupled to the support structure 26. The hydrodynamic friction bearing 22 is configured to take up a load from the rolling bearing 24, which supports the shaft 28, and transfers this load to the support structure 26. A second distance Z2 between a main axis A of the shaft 28 and the hydrodynamic friction bearing 22 is greater than a first distance Z1 between the rolling bearing 24 and the main axis A. The hydrodynamic friction bearing 22 therefore experiences the higher circumferential speed, when compared to the rolling bearing 24. This will advantageously establish the hydrodynamic film in the lubricating gap at a lower number of revolutions of the supported shaft 28, when compared to a vice versa configuration of the two bearings 22, 24. This enables the hydrodynamic friction bearing 22 to take up the load of the shaft 28 at a relatively low speed of rotation.

In FIG. 10, there is a simplified schematic drawing illustrating a hybrid shaft bearing 20, which is configured according to the concept of FIG. 9. The bearing 20 is applied to support a main shaft 28 in a drive train of a wind generator 2. The drawing is similar to those in FIGS. 5 and 6; with the same parts being provided with the same reference numerals. The hydrodynamic friction bearing 22 is configured to take up a load from the rolling bearing 24, which supports the shaft 28, and transfers this load to the support structure 26. A second distance (not depicted for clarity reasons only) between a main axis A of the shaft 28 and the hydrodynamic friction bearing 22 is greater than a first distance between the rolling bearing 24 and the main axis A. The hydrodynamic friction bearing 22 therefore experiences the higher circumferential speed, when compared to the rolling bearing 24.

Figure 12:
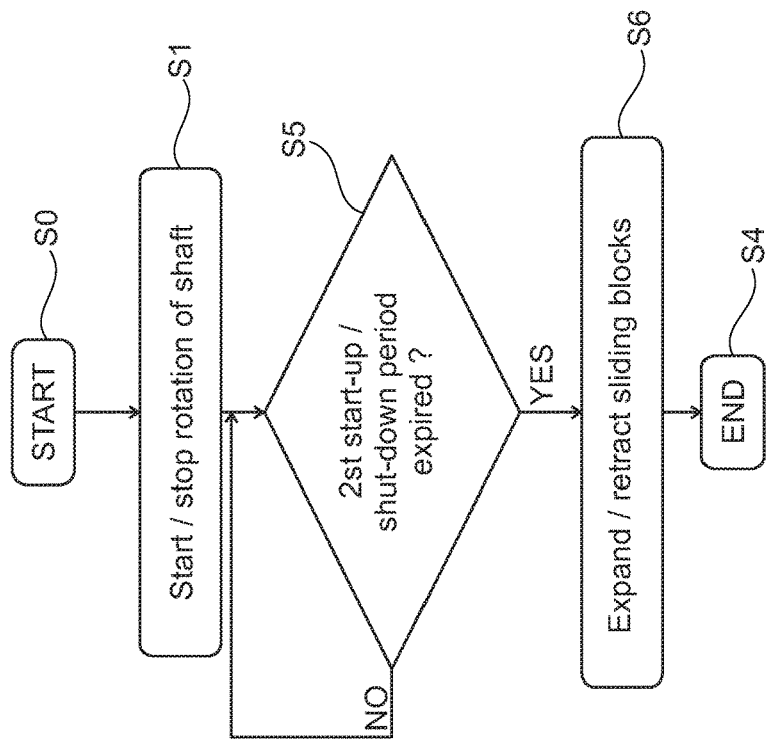
FIGS. 11 and 12 are simplified flow charts illustrating methods of operating a hybrid shaft bearing, according to further embodiments of the invention.
Figure 11:
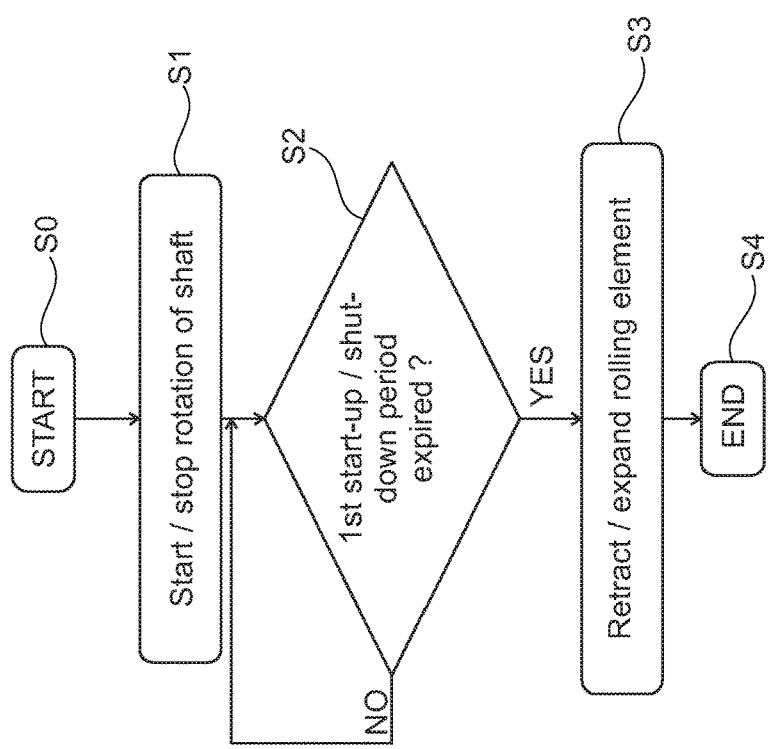

In FIGS. 11 and 12, there are flow charts illustrating a method for operating a hybrid shaft bearing 20, according to embodiments of the invention.

The method, which is illustrated in FIG. 11, in particular applies to hybrid shaft bearing 20, which is configured according to the embodiment of FIG. 3. The flow chart illustrates a situation, in which the shaft 28 starts rotating, for example upon start-up of the wind generator 2, and in which the shaft 28 decelerates and stops rotating, for example during shut-down of the wind generator 2.

First, the method of operating the hybrid shaft bearing 20 during start-up of the wind generator 2 will be explained.

First, the shaft 28 starts rotating (step S0, step S1). Subsequently, it is determined whether a first start-up period expired (step S2). This can be performed by capturing the speed of rotation or the value for the number of revolutions of the supported shaft 28 or by using a timer starting upon start up of the wind generator 2. When the first start-up period expires, the method follows the branch "YES", otherwise it follows the branch "NO" until the predetermined criterion for expiration of the first start-up period is fulfilled.

The first start-up period is selected in that a speed of rotation of the supported shaft 28 or a peripheral speed at the hydrodynamic friction bearing 22 is sufficiently high in that said bearing is capable of taking up sufficient loads due to the establishment of the hydrodynamic fluidic lubricating film. When the start-up period expires, the rolling element 72 of the rolling bearing 24 is retracted (step S3) (see also FIG. 3). In other words, the rolling element 72 is taken off the cooperating bearing surface 34 and the rolling bearing 24 is released from load. The method for operating the hybrid shaft bearing 20 ends in step S4.

Upon slowdown of the rotating shaft 28 (step S0, S1), it is checked whether a first shut-down period expired. Again, this can be performed by measuring the rotational speed of the shaft 28. The rolling element 72 is expanded to cooperate with its sliding surface 34 in order to take up a load of the shaft 28 (step S3). The lubricating film in the hydrodynamic friction bearing 22 is likely to become instable at low rotational speeds of the shaft 28. To avoid a contact between the corresponding sliding surfaces 73, 75 and/or a mixed friction state, the first actuator 32 is expanded (see also FIG. 3). Furthermore, the expansion of the rolling element 72 avoids play in the hybrid shaft bearing 20 at low speeds. Naturally, this also applies to the situation at start-up of rotation.

In FIG. 12, there is another flow chart illustrating a method of operating a hybrid shaft bearing 20, in particular the hybrid shaft bearing 20 according to the embodiment of FIG. 8.

Again, first the situation upon start-up and second the situation upon slowdown will be explained. Similar to the flow chart in FIG. 11, the shaft 28 starts rotating (step S0, step S1) and it is determined, whether a second start-up period is expired (step S5). In particular, the first and the second start-up period can be almost identical. Similar to the first start-up period, also the second start-up period can be a predetermined time span or a threshold with respect to a rotational speed of the shaft 28. When the peripheral speed at the hydrodynamic friction bearing 22 is sufficiently high for establishing the lubricating film in the lubricating gap 71 (FIG. 7), the sliding blocks 82, 84 are expanded (step S6). Consequently, the hydrodynamic friction bearing 22 will take up the load of the shaft 28. The method ends in step S4, typically when the operating speed of the shaft 28 is reached.

The method, which is illustrated in the flow chart of FIG. 12, can also be applied upon slowdown of the rotating shaft 28. The start-up period (step S5) is replaced by a shut-down period. Again, this can be determined using a predetermined time span or a threshold value for a number of revolutions of the shaft 28. When the rotational speed of the shaft 28 falls below a certain threshold value, the sliding blocks 82, 84 are retracted so as to avoid a contact between the cooperating sliding surfaces 73, 75. Upon retraction of the sliding blocks 82, 84, the rolling bearing 24 will take up the load of the rotating shaft 28.

Within the context of this specification, the hydrodynamic friction bearing 22 is a passive hydrodynamic bearing. In other words, the hybrid bearing 22 dispenses with active supply of lubricant to the lubricating gap 71. In particular, the hybrid bearing 22 does not comprise an oil pump or another oil supply system, which can actively pressurize the lubricant in the hydrodynamic friction bearing 22.

This advantageously applies to all embodiments of the invention.

The hybrid shaft bearing 20 according to embodiments of the invention has a high reliability and low requirements with respect to maintenance. When compared to friction bearings, which apply an active system for pressurizing the lubricant, the design of the hybrid bearing 20 according to embodiments of the invention is technically simpler in that it requires less actively controlled parts. For example it dispenses with an oil supply system. In particular, when the hybrid shaft bearing 20 is mounted in an offshore wind generator 2, the reduced requirements for maintenance lower the service expenses significantly. Furthermore, the design of the hybrid shaft bearing 20 having a hydrodynamic friction bearing 22 and a rolling bearing 24, which are substantially independent from each other, allows each of the bearings 22, 24 to be replaced separately. This advantageously simplifies the maintenance of the hybrid bearing 20. In addition to this, the hybrid shaft bearing 20 is play-free even at low rotational speeds of the supported shaft 28.

Although the invention has been described hereinabove with reference to specific embodiments, it is not limited to these embodiments and no doubt further alternatives will occur to the skilled person that lie within the scope of the invention as claimed.

The invention claimed is:

1. A hybrid shaft bearing for support of a shaft of a wind generator comprising:
a hydrodynamic friction bearing and a rolling bearing, wherein both the hydrodynamic friction and rolling bearings cooperate with a support structure and support a wind generator shaft, wherein the hydrodynamic friction bearing is a passive hydrodynamic bearing, and wherein the rolling bearing is prestressed, and wherein a pre-tension, which is applied by the rolling bearing has a value, which is equal to or greater than a minimum capacity load of the hydrodynamic friction bearing.

2. The hybrid shaft bearing according to claim 1, wherein the minimum capacity load of the hydrodynamic friction bearing is the minimum capacity load of the hydrodynamic friction bearing at maximum speed of rotation of the hybrid shaft bearing.

3. The hybrid shaft bearing according to claim 1, wherein the value of the pre-tension is adjustable.

4. The hybrid shaft bearing according to claim 1, wherein the hydrodynamic friction bearing and the rolling bearing are arranged parallel in that both the hydrodynamic friction and rolling bearings are coupled to the support structure and rotatably support the shaft.

5. The hybrid shaft bearing according to claim 4, comprising at least one actuator that moves a bearing part of either one or both of the hydrodynamic friction bearing and the rolling bearing.

6. The hybrid shaft bearing according to claim 5, wherein the at least one actuator comprises at least a first actuator, and wherein the first actuator supports a rolling element of the rolling bearing, and wherein the first actuator moves the rolling element towards and away from a bearing surface, which cooperates with the rolling element.

7. The hybrid shaft bearing according to claim 6, wherein the at least one actuator further comprises a second actuator that moves a sliding surface of the hydrodynamic friction bearing towards and away from an opposite sliding surface.

8. The hybrid shaft bearing according to claim 7, wherein the hydrodynamic friction bearing comprises a sliding block carrying the sliding surface, wherein the sliding block is supported and driven by the second actuator in that, the sliding block is expandable and retractable.

9. The hybrid shaft bearing according to claim 1, wherein the hydrodynamic friction bearing and the rolling bearing are coupled in series, and wherein one of the hydrodynamic friction and rolling bearings supports the shaft and the other of the hydrodynamic friction and rolling bearings is coupled to the support structure, wherein the bearing being coupled to the support structure takes up a load from the bearing supporting the shaft and transfers the load to the support structure.

10. The hybrid shaft bearing according to claim 9, wherein the rolling bearing supports the shaft and the hydrodynamic friction bearing is coupled to the support structure.

11. The hybrid shaft bearing according to claim 1, wherein the wind generator shaft comprises a wind generator main shaft.

12. A wind generator comprising:
a drive train comprising a main shaft, wherein the main shaft is supported by a hybrid shaft bearing;
wherein the hybrid shaft bearing comprises a hydrodynamic friction bearing and a rolling bearing, wherein both the hydrodynamic friction and rolling bearings cooperate with a support structure and support a shaft, wherein the hydrodynamic friction bearing is a passive hydrodynamic bearing; and
wherein the rolling bearing is prestressed, and wherein a pre-tension, which is applied by the rolling bearing has a value, which is equal to or greater than a minimum capacity load of the hydrodynamic friction bearing.

13. A method of using a hybrid shaft bearing to support a main shaft of a drive train in a wind generator the method comprising the steps of:
using a hydrodynamic friction bearing and a rolling bearing, wherein both the hydrodynamic friction and rolling bearings cooperate with a support structure and support a shaft, wherein the hydrodynamic friction bearing is a passive hydrodynamic bearing, and
wherein the rolling bearing is prestressed, and wherein a pre-tension, which is applied by the rolling bearing has a value, which is equal to or greater than a minimum capacity load of the hydrodynamic friction bearing.

14. A method for operating a hybrid shaft bearing, comprising:
providing a hydrodynamic friction bearing and a rolling bearing, wherein the hydrodynamic friction bearing and the rolling bearing are arranged parallel in that both the hydrodynamic friction and rolling bearings are coupled to a support structure and rotatably support a shaft, wherein the rolling bearing is prestressed, and wherein a pre-tension, which is applied by the rolling bearing has a value, which is equal to or greater than a minimum capacity load of the hydrodynamic friction bearing, and wherein the hybrid shaft bearing comprises at least one actuator that moves a bearing part of either one or both of the hydrodynamic friction bearing and the rolling bearing; and
expanding or retracting the at least one actuator during start-up or shut-down of the rotation of the shaft.

15. The method of operating the hybrid shaft bearing according to claim 14, including the steps of:
supporting a rolling element of the rolling bearing with a first actuator that moves the rolling element towards and away from a bearing surface, which cooperates with the rolling element; and retracting the first actuator when a first predetermined start-up period expired and/or the step of expanding the first actuator, when a first predetermined shut-down period expired.

16. The method of operating the hybrid shaft bearing according to claim 15, wherein the hydrodynamic friction bearing comprises a second actuator that moves a sliding block carrying one of the sliding surfaces of the hydrodynamic friction bearing, and the second moves the sliding block towards and away from a bearing surface, which cooperates with the sliding block, and including the step of expanding the second actuator when a second predetermined start-up period expired and/or the step of retracting the second actuator, when a second predetermined shut-down period expired.

* * * * *